INVENTOR
Dudley B. Clark
BY
John S. Powers
ATTORNEY

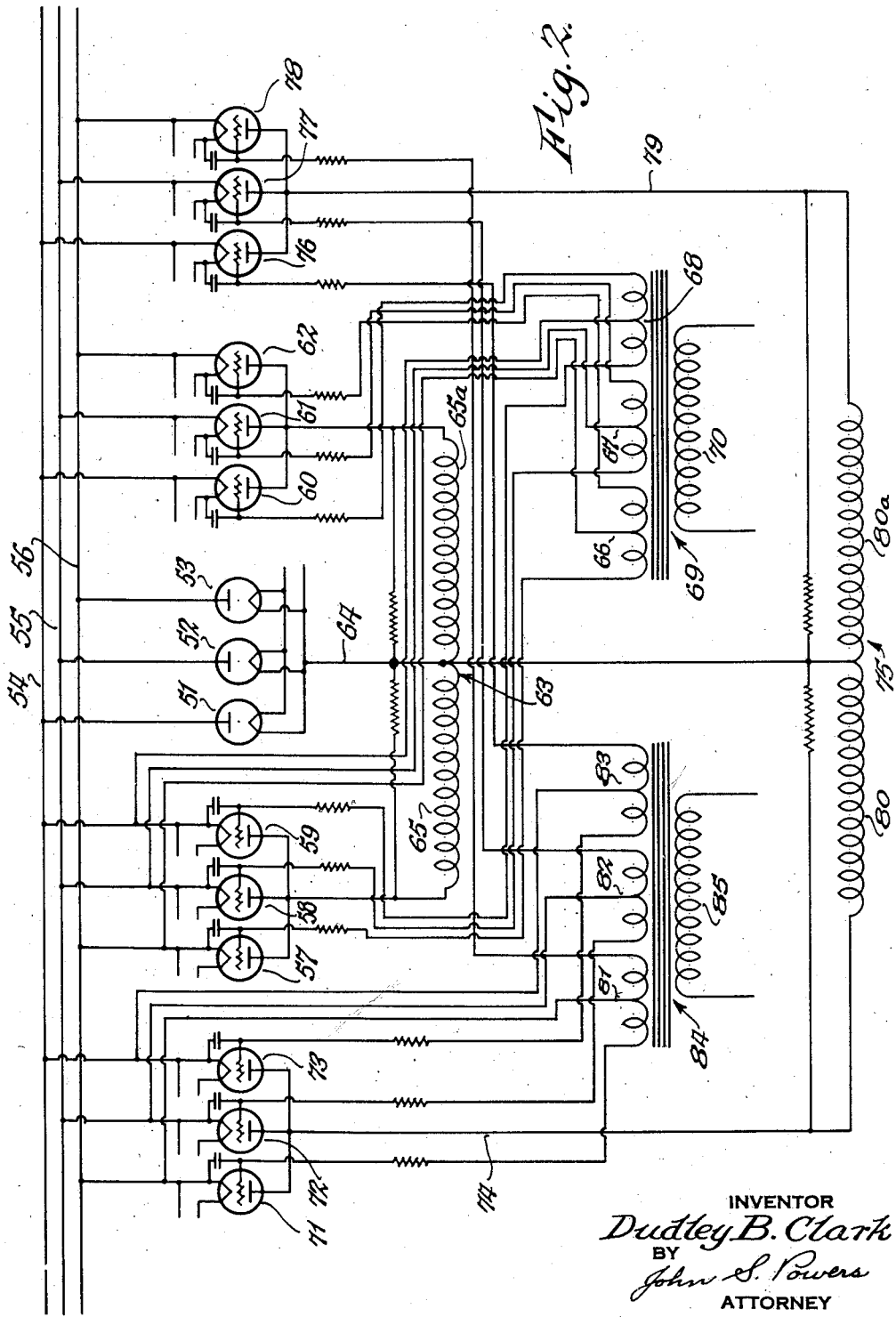

Patented Apr. 21, 1942

2,280,749

UNITED STATES PATENT OFFICE 2,280,749

ELECTRIC VALVE CONVERTING SYSTEM

Dudley B. Clark, Palm Springs, Calif., assignor to General Electronics Corporation, Long Beach, Calif., a corporation of Nevada Application November 28, 1940, Serial No. 367,601

15 Claims. (Cl. 172—281)

This invention relates to improvements in electric valve converting systems and, although not necessarily so limited, is characterized by features which adapt it particularly to the transmission of power between polyphase and pulsating current circuits, being available, among other uses, for the production of single-phase alternating current.

One object of the invention is to provide a system which will enable the use of inexpensive valves of small capacity and which will render unnecessary transformers and other auxiliary equipment such as have heretofore been employed in advance of the valves, this object contemplating the conversion, directly and without prior rectification, of the current from the feed circuit into pulsations of the desired frequency.

A further object is to provide a system which will produce pulsations having a wave form closely approaching that of direct current.

A still further object is to provide a system wherein the frequency of the pulsations may be varied over a wide range.

A still further object is to provide a system which is available for the transmission of pulsating current of different frequencies to a plurality of output circuits.

The invention is illustrated in the accompanying drawings in which:

Figure 2 is a diagrammatic view of a modification of the system shown in Figure 1.

Figure 1:
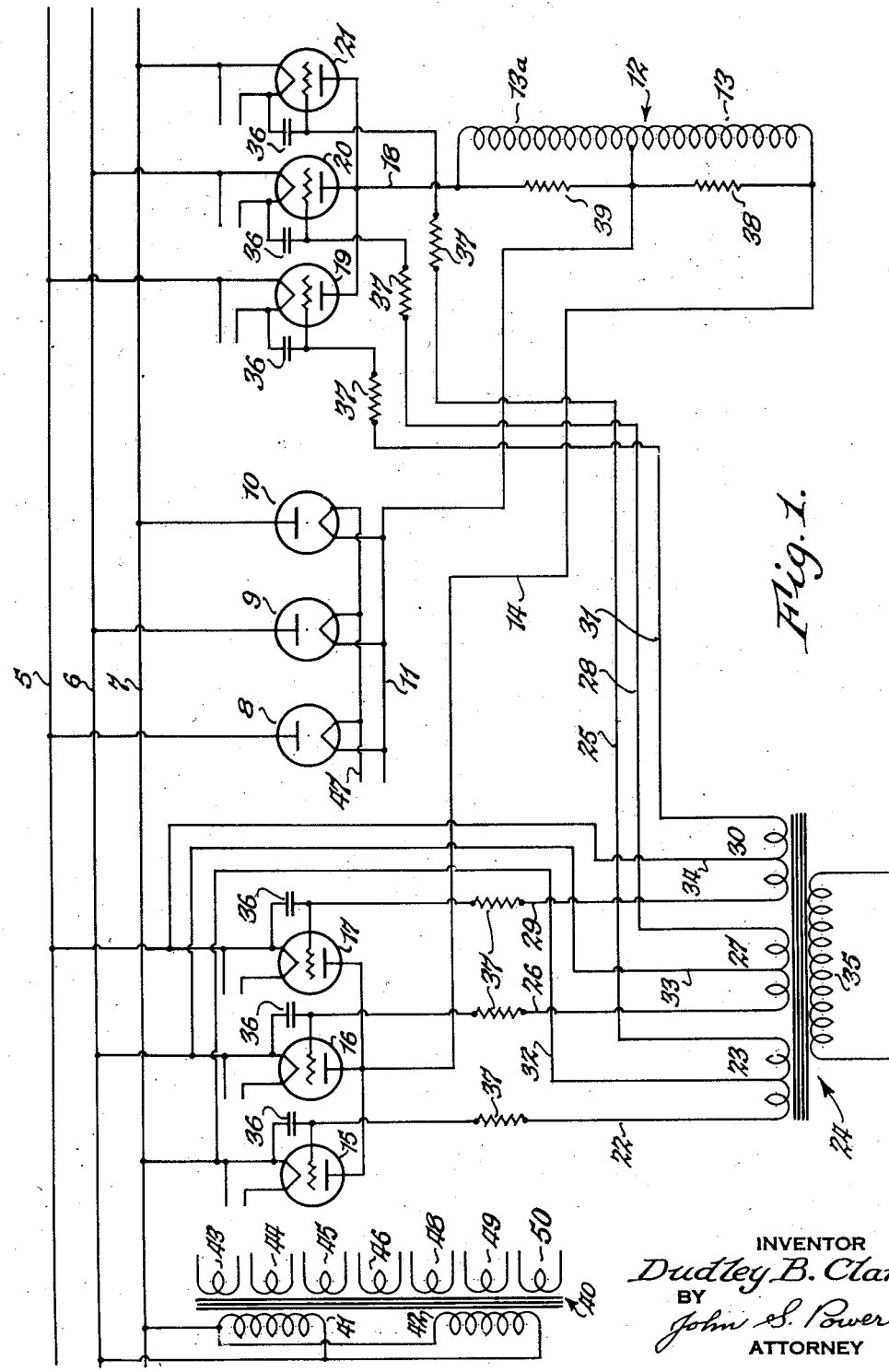
Figure 1 is a diagrammatic view of an electric valve converting system embodying the features of the invention.

The system is illustrated, by way of example, in connection with a three-phase alternating current supply circuit, the power lines of the said circuit being indicated at 5, 6 and 7 and being connected to the plates of diodes 8, 9 and 10, respectively. The filaments of the said diodes are connected by a line 11 to a center tap on an inductance coil 12, the center tap dividing the coil into sections 13 and 13a. The former is connected by a line 14 to the plates of a group of triodes 15, 16 and 17, the filaments of which are connected to the lines 7, 6 and 5, respectively, of the supply circuit. The coil section 13a, on the other hand, is connected by a line 18 to the plates of a second group of triodes 19, 20 and 21, the filaments of which are connected to the lines 5, 6 and 7, respectively, of the supply circuit. In this connection it is to be understood that the system is not limited to gas-containing diodes and triodes, but may be availed of at higher voltages with tubes of the vacuum type.

In accordance with the invention the two groups of triodes are rendered conductive in alternation. To this end the grid of the tube 15 is connected by a line 22 to one side of a secondary 23 of a transformer 24, the other side of the secondary being connected by a line 25 to the grid of the tube 21; the grid of the tube 16 is connected by a line 26 to one side of a secondary 27 of the transformer 24, the other side of the secondary being connected by a line 28 to the grid of the tube 20; and the grid of the tube 17 is connected by a line 29 to one side of a secondary 30, the other side of the secondary being connected by a line 31 to the grid of the tube 19.

A line 32 connects a center tap on the secondary 23 to the line connecting the filament of the tube 15 and the supply line 7 which is common to the cathodes of the tubes 15 and 21; a line 33 connects a center tap on the secondary 27 to the line connecting the filament of the tube 16 and the supply line 6 which is common to the cathodes of the tubes 16 and 20; and a line 34 connects a center tap on the secondary 30 to the line connecting the filament of the tube 17 and the supply line 5 which is common to the cathodes of the tubes 17 and 19. The primary of the transformer 24 is indicated at 35. It is adapted to be connected to an alternating current of a predetermined frequency, whereby during one-half of each cycle the bias on the grids of the tubes 15, 16 and 17 will be positive and that on the grids of the tubes 19, 20 and 21 negative and during the second half of the cycle the bias on the grids of the tubes 15, 16 and 17 will be negative and that on the grids of the tubes 19, 20 and 21 positive. The grid index current may be produced in any suitable manner as, for example, by a saw-tooth oscillator, rotary converter or single tube inverter circuit.

As shown and preferred, a condenser 36 is shunted across the grid and filament of each triode in order to stabilize the grid voltage. A resistance 37 may also be included in each grid circuit to maintain the current in the latter below the value at which injury to the tubes might otherwise result. Preferably, bleeder resistances 38 and 39 are shunted across the sections of coil 12, thereby providing a non-inductive flow of current across the two groups of triodes and increasing the discharging rate of the coil sections. Current for energizing filaments of the various tubes is furnished by a transformer 40. The latter includes two primaries 41 and 42 which are connected in parallel across the line 6 and 7 of the supply circuit. The transformer 40 also includes secondaries 43, 44 and 45 to which the filaments of the triodes 15, 16 and 17, respectively, may be connected; it includes a secondary 46 to which the filaments of the diodes 8, 9 and 10 may be connected by the line 11 and a line 47; and it includes secondaries 48, 49 and 50 to which the filaments of the triodes 19, 20 and 21, respectively, may be connected.

From the foregoing it will be apparent that the two groups of triodes are rendered conductive in alternation, thereby permitting current impulses to flow first through one of the sections of the coil 12 and then through the other. Each impulse represents a half cycle of alternating current. The frequency of the impulses corresponds to that of the grid index current and may be varied by varying the frequency of the latter. The pulsations traversing the coil sections 13 and 13a may be utilized in any desired manner. For example, the said sections may be arranged around the barrel of an electric hammer to reciprocate the tool actuating piston. On the other hand, the pulsations traversing the coil sections 13 and 13a may be employed to provide an alternating current. In such case the said sections serve as the primaries of a transformer and cooperate with a single secondary, the pulsations traversing the coil section 13 inducing a flow of current in one direction through the secondary while the pulsations traversing the coil section 13a induce a flow of current through the secondary in the opposite direction. In this connection it will be noted that the groups of triodes perform two functions, namely, they control the passage of the current impulses through the coil sections and they also control the frequency of the impulses.

It will be noted that the single group of diodes cooperates with the two groups of triodes to provide two rectifiers which act in alternation, each of the rectifier circuits including one of the coil sections of a load circuit. The use of a half-wave tube in connection with each phase is highly advantageous. The three tubes have an output three times as large as a single tube despite the fact that they are in use only one-half of the time, the diversion of the output first through one of the group of triodes and then through the other further reducing the time during which the diodes are conductive. For example, if 2.5 ampere mercury tubes (with a maximum instantaneous anode current of 15 amperes) are employed they may be operated at 880 volts while providing for a substantial margin of safety, it being understood that the system shown has a crest inverse voltage of approximately 1.04 times that of the forward voltage. On the other hand, if an ignitron type of tube is employed at 400 volts, or less, commercial tubes with a current rating of 5, 10, 20, 40, 125 and 400 amperes are available at a substantially lower cost per ampere output than tubes of the thermionic type. It will be apparent, therefore, that the system has the advantage that it enables the use of inexpensive low capacity commercial tubes.

The line voltage per phase (A. C. supply) is .740 of the instantaneous D. C. across either coil section 13 or 13a while the voltage across both of the coil sections is twice this amount. If the power factor of the inductive load is corrected, or partially corrected, at the terminals of the coil 12 by a capacitor of 10 micro-farads, for example, the capacitor will charge to twice the voltage across 13a. Hence when the grids of triodes 15, 16 and 17 become positive, the voltage of the plates of the triodes 19, 20 and 21 is momentarily reduced below the firing potential, thereby giving the latter tubes time to de-ionize before the next positive impulse in the grid circuit. Although the exact limits have not been determined, tests have shown that the system is available to produce pulsations having frequencies ranging up to 16,000 cycles depending to a large extent upon the type of tube employed. The system will continue to operate even though one or more of the tubes in one phase should fail. If this is intended, however, it is preferred that an inductive choke be included in the line 11.

The pulsations which are caused to traverse the sections of the coil 12 have a wave form closely approaching that of direct current. For example, assuming the output frequency to be adjusted to 60 cycles, each impulse will comprise six power waves which deviate only slightly from a straight D. C. current. No filter is, therefore, necessary. If desired, however, a small choke may be inserted in the line 11 to produce a substantially pure D. C. current at full load. If the grid circuit is adjusted to give an output frequency of thirty cycles each impulse will comprise twelve power waves while if it is adjusted to give an output frequency of 120 cycles each impulse will consist of only three waves. However, this ripple wave is so small in magnitude that the output frequency will not lock into the frequency of the supply circuit.

A modified form of system is shown in Figure 2. In this embodiment the system is also illustrated in connection with a three-phase alternating current supply circuit and also includes a group of diodes which are indicated at 51, 52 and 53, the power lines of said circuit being indicated at 54, 55 and 56 and being connected, respectively, to the plates of the said diodes. Two groups of triodes 57, 58, 59 and 60, 61, 62 are employed in connection with the diodes, the plates of one group being connected to one side of an inductance coil 63 and the plates of the other group to the other side of the said coil. A line 64 connects a center tap on the coil 63 to the cathodes of the diodes 51, 52 and 53 and divides the coil into two sections 65 and 65a, the cathodes of the two groups of triodes being connected to the lines of the current supply circuit. The grids of the tubes 57, 58, 59, 60, 61 and 62 are connected to secondaries 66, 67 and 68 of a transformer 69. The primary 70 of the latter is connected to a grid index current of a predetermined frequency, whereby during one-half of each cycle the bias on the grids of the tubes 57, 58 and 59 will be positive and that upon the grids of the tubes 60, 61 and 62 negative and during the second half of the cycle the bias on the grids of the tubes 57, 58 and 59 will be negative and that on the grids of the tubes 60, 61 and 62 positive. The frequency of the impulses which are thereby caused to traverse the two sections of the coil 63 corresponds to, and is variable with, that of the grid index current furnished by the transformer 69. So much of the system as has been described, therefore, is substantially the same as that illustrated in Figure 1.

In the embodiment under consideration, however, two additional groups of triodes are employed in connection with the diodes 51, 52 and 53. The plates of the triodes 71, 72 and 73 of one group are connected by line 74 to one side of an inductance coil while the plates of the triodes 76, 77 and 78 of the other group are connected by a line 79 to the other side of the said coil, a center tap on the latter being connected by the line 64 to the cathodes of the diodes 51, 52 and 53 and dividing the coil into sections 80 and 80a. The cathodes of the triodes 71, 72 and 73 are connected to the lines 56, 55 and 54, respectively, of the current supply circuit. The cathodes of the triodes 76, 77 and 78, on the other hand, are connected, respectively, to the lines 54, 55 and 56.

The invention contemplates the utilization of the triodes 71, 72, 73, 76, 77 and 78 in connection with the diodes 51, 52 and 53 to cause to traverse the sections of the coil 75 current impulses having a different frequency from that of the impulses which are caused to traverse the sections of the coil 63. To this end the grids of the said triodes are connected to secondaries 81, 82 and 83 of a transformer 84. The primary 85 of the latter is adapted to be connected to an alternating, grid index current of a predetermined frequency, whereby during half of each cycle the bias on the grids of the tubes 71, 72 and 73 will be positive and that on the grids of the tubes 76, 77 and 78 negative and during the other half of the cycle the bias on the grids of the first group of tubes will be negative and that on the grids of the second group positive. It will be apparent, therefore, that the pulsations thus produced are directed alternately through the sections of the coil 75, the frequency of the pulsations traversing the coil sections being independent of that of the pulsations traversing the sections of the coil 63. Two independent output frequencies are thus provided, although the same diodes are utilized for both. It will also be apparent that by utilizing additional groups of triodes still other frequencies may be produced at the same time so long as the capacity of the group of diodes is not exceeded.

The principles outlined above also hold true for supply circuits of different phases. For example, in a six-phase supply circuit there would be six tubes in each group or, in other words, one tube in each group per phase.

If desired the current furnished a load circuit may be obtained from a single-phase supply line by including a filter choke in the line 11 of Figure 1 or in the line 64 of Figure 2 and rendering inoperative, in any suitable manner, the tubes of one phase.

I claim as my invention:

1. An electric valve converting system including an alternating current supply circuit, a load circuit, a group of valves, one for connecting each line of said supply circuit to one side of said load circuit, a second group of valves, one for connecting each of said lines to the other side of said load circuit, and means for controlling the conductivity of one of said groups of valves, whereby to cause current impulses of a predetermined frequency to traverse said load circuit.

2. An electric valve converting system including an alternating current supply circuit, a load circuit, a group of diodes, one for connecting each line of said supply circuit to one side of said load circuit, a group of triodes, one for connecting each of said lines to the other side of said load circuit, and means for controlling the conductivity of said group of triodes, whereby to cause current impulses of a predetermined frequency to traverse said load circuit.

3. An electric valve converting system including a polyphase alternating current supply circuit, a load circuit, a group of diodes, one for connecting each of the lines of said supply circuit to one side of said load circuit, a group of triodes, one for connecting each of said lines to the other side of said load circuit, and means for controlling the conductivity of said group of triodes, whereby to cause current impulses of a predetermined frequency to traverse said load circuit.

4. An electric valve converting system including an alternating current supply circuit, a load circuit, a group of valves, one for connecting each line of said supply circuit to one side of said load circuit, a second group of valves, one for connecting each of said lines to the other side of said load circuit, a bleeder resistance shunted across said load circuit, and means for controlling the conductivity of said valves, whereby to cause current impulses of a predetermined frequency to traverse said load circuit.

5. An electric valve converting system including an alternating current supply circuit, a load circuit, a group of diodes, one for connecting each line of said supply circuit to one side of said load circuit, a group of triodes, one for connecting each of said lines to the other side of said load circuit, a bleeder resistance shunted across said load circuit, and means for controlling the conductivity of said group of triodes, whereby to cause current impulses of a predetermined frequency to traverse said load circuit.

6. An electric valve converting system including an alternating current supply circuit, at least two load circuits, a plurality of groups of valves, each valve of one of said groups connecting one of the lines of said supply circuit to one side of each of said load circuits, each valve of a second group connecting one of said lines to the other side of one of said load circuits and each valve of a third group connecting one of said lines to the other side of the other of said load circuits, and means for rendering said second and third groups of valves conductive in alternation while the valves of said first mentioned group are continuously conductive, whereby to cause current impulses to traverse first one of said load circuits and then the other.

7. An electric valve converting system including an alternating current supply circuit, at least two load circuits, a plurality of groups of valves, there being one valve in each group for each of the lines of said supply circuit, each valve of one of said groups connecting one of said lines to one side of each of said load circuits, each valve of a second group connecting one of said lines to the other side of one of said load circuits and each valve of a third group connecting one of said lines to the other side of the other of said load circuits, and means for rendering said second and third groups of valves conductive in alternation while the valves of said first mentioned group are continuously conductive, whereby to cause current impulses to traverse first one of said load circuits and then the other.

8. An electric valve converting system including an alternating current supply circuit, at least two load circuits, a group of diodes, two groups of triodes, each of said diodes connecting one of the lines of said supply circuit to one side of each of said load circuits, each triode of one group connecting one of said lines to the other side of one of said load circuits and each triode of the other group connecting one of said lines to the other side of the other of said load circuits, and means for rendering said groups of triodes conductive in alternation while the said diodes are continuously conductive, whereby to cause current impulses to traverse first one of said load circuits and then the other.

9. An electric valve converting system including an alternating current supply circuit, at least two load circuits, a group of diodes, two groups of triodes, there being one valve in each group for each of the lines of said supply circuit, each of said diodes connecting one of said lines to one side of each of said load circuits, each triode of one group connecting one of said lines to the other side of one of said load circuits and each triode of the other group connecting one of said lines to the other side of the other of said load circuits, and means for rendering said groups of triodes conductive in alternation while said diodes are continuously conductive, whereby to cause current impulses to traverse first one of said load circuits and then the other.

10. An electric valve converting system including a polyphase alternating current supply circuit, at least two load circuits, a plurality of groups of valves, there being one valve in each group per phase, each valve of one of said groups connecting one of the lines of said supply circuit to one side of each of said load circuits, each valve of a second group connecting one of said lines to the other side of one of said load circuits and each valve of a third group connecting one of said lines to the other side of the other of said load circuits, and means for rendering said second and third groups of valves conductive in alternation while the valves of said first mentioned group are continuously conductive, whereby to cause current impulses to traverse first one of said load circuits and then the other.

11. An electric valve converting system including an alternating current supply circuit, at least two load circuit, a plurality of groups of valves, each valve of one of said groups connecting one of the lines of said supply circuit to one side of each of said load circuits, the valves of second and third groups each including an anode, a cathode and a control electrode, each valve of the second group connecting one of said lines to the other side of one of said load circuits and each valve of the third group connecting one of said lines to the other side of the other of said load circuits, means for impressing a bias upon said control electrodes to render said second and third groups of valves conductive in alternation while the valves of said first mentioned group are continuously conductive, whereby to cause current impulses to traverse first one of said load circuits and then the other, and condensers shunted across said cathodes and control electrodes to stabilize the voltage of the latter.

12. An electric valve converting system including an alternating current supply circuit, at least two load circuits, a plurality of groups of valves, each valve of one of said groups connecting one of the lines of said supply circuit to one side of each of said load circuits, each valve of a second group connecting one of said lines to the other side of one of said load circuits and each valve of a third group connecting one of said lines to the other side of the other load circuit, means for rendering said second and third groups of valves conductive in alternation while the valves of said first mentioned group are continuously conductive, whereby to cause current impulses to traverse first one of said load circuits and then the other, and a bleeder resistance shunted across one of said load circuits.

13. An electric valve converting system including an alternating current supply circuit, at least two load circuits, a plurality of groups of valves, each valve of one of said groups connecting one of the lines of said supply circuit to one side of each of said load circuits, the valves of second and third groups each including an anode, a cathode and a control electrode, each valve of the second group connecting one of said lines to the other side of one of said load circuits and each valve of the third group connecting one of said lines to the other side of the other of said load circuits, means for impressing a bias upon said control electrodes to render said second and third groups of valves conductive in alternation while the valves of the first group are continuously conductive, whereby to cause current impulses to traverse first one of said load circuits and then the other, condensers shunted across said cathodes and control electrodes to stabilize the voltage of the latter, and bleeder resistances shunted across said load circuits.

14. An electric valve converting system including an alternating current supply circuit, a plurality of load circuits, a plurality of groups of valves, each valve of one of said groups connecting one of the lines of said supply circuit to one side of each of said load circuits, each valve of a second group connecting one of said lines to the other side of one of a pair of said load circuits, each valve of a third group connecting one of said lines to the other side of the other of said pair of circuits, each valve of a fourth group connecting one of said lines to the other side of one of a second pair of said load circuits and each valve of a fifth group connecting one of said lines to the other side of the other of said second pair of load circuits, means for rendering said second and third groups of valves conductive in alternation while the valves of said first mentioned group are continuously conductive to cause impulses of one frequency to traverse first one of said first mentioned pair of load circuits and then the other, and means for rendering said fourth and fifth groups of valves conductive in alternation to cause impulses of a different frequency to traverse first one of said second pair of load circuits and then the other.

15. An electric valve converting system including an alternating current supply circuit, a plurality of load circuits, a group of diodes, a plurality of groups of triodes, there being one valve in each group of diodes and triodes for each line of said supply circuit, each of said diodes connecting one of said supply lines to one side of each of said load circuits, each triode of one of said groups connecting one of said lines to the other side of one of a pair of said load circuits, each triode of a second group connecting one of said lines to the other side of the other of said pair of circuits, each triode of a third group connecting one of said lines to the other side of one of a second pair of said load circuits and each triode of a fourth group connecting one of said lines to the other side of the other of said second pair of load circuits, means for rendering said first mentioned group and said second group of triodes conductive in alternation while said diodes are continuously conductive to cause impulses of a predetermined frequency to traverse first one of said first mentioned pair of load circuits and then the other, and means for rendering said third and fourth groups of triodes conductive in alternation to cause impulses of a different frequency to traverse first one of said second pair of load circuits and then the other.

DUDLEY B. CLARK.